US009639531B2

(12) United States Patent
Deliyannis

(10) Patent No.: US 9,639,531 B2
(45) Date of Patent: May 2, 2017

(54) METHODS AND APPARATUS TO PLAY AND CONTROL PLAYING OF MEDIA IN A WEB PAGE

(75) Inventor: Alexandros Deliyannis, Tampa, FL (US)

(73) Assignee: The Nielsen Company (US), LLC, New York, NY (US)

(*) Notice: Subject to any disclaimer, the term of this patent is extended or adjusted under 35 U.S.C. 154(b) by 1293 days.

(21) Appl. No.: 12/100,264

(22) Filed: Apr. 9, 2008

(65) Prior Publication Data

US 2009/0259926 A1  Oct. 15, 2009

(51) Int. Cl.
*G06F 17/00* (2006.01)
*G06F 17/30* (2006.01)
*G06F 17/22* (2006.01)

(52) U.S. Cl.
CPC ...... *G06F 17/3002* (2013.01); *G06F 17/2288* (2013.01); *G06F 17/30017* (2013.01); *G06F 17/30047* (2013.01); *G06F 17/30781* (2013.01); *G06F 17/30784* (2013.01); *G06F 17/30896* (2013.01)

(58) Field of Classification Search
CPC ............ G06F 1/3002; G06F 1/300477; G06F 1/30017; G06F 1/212; G06F 1/30047; G06F 17/30017; G06F 17/2247; G06F 17/211; G06F 17/212; G06F 17/3079; G06F 17/30781; G06F 17/30784; G06F 17/2288; G06F 17/30896
USPC ........ 715/205, 234, 255, 272, 736; 382/291, 382/305, 286; 725/9–10, 14
See application file for complete search history.

(56) References Cited

U.S. PATENT DOCUMENTS

| 5,151,788 | A | | 9/1992 | Blum |
| 5,987,171 | A | * | 11/1999 | Wang ............................ 382/173 |
| 5,999,688 | A | | 12/1999 | Iggulden et al. |
| 5,999,689 | A | | 12/1999 | Iggulden |
| 6,014,458 | A | | 1/2000 | Wang |
| 6,046,740 | A | | 4/2000 | LaRoche et al. |
| 6,311,194 | B1 | | 10/2001 | Sheth et al. |
| 6,353,929 | B1 | | 3/2002 | Houston |

(Continued)

FOREIGN PATENT DOCUMENTS

| EP | 1120732 | 8/2001 |
| JP | 2004157907 | 6/2004 |

(Continued)

OTHER PUBLICATIONS

European Patent Office, Extended European Search Report issued in connection with European Patent Application No. 09012337.3 (corresponding to U.S. Appl. No. 12/240,756), mailed Jan. 7, 2010, 8 pages.

(Continued)

*Primary Examiner* — Thu Huynh
(74) *Attorney, Agent, or Firm* — Hanley, Flight & Zimmerman, LLC

(57) ABSTRACT

Methods and apparatus to play and control playing of media content in a web page are disclosed. In one example, a method of monitoring media content in a web page loads a web page containing a media player and media content, processes an image of the web page to determine a control associated with the media player, and monitors the media content based on the control.

26 Claims, 7 Drawing Sheets

(56) References Cited

U.S. PATENT DOCUMENTS

| | | | |
|---|---|---|---|
| 6,460,023 B1* | 10/2002 | Bean | G06F 21/10 |
| | | | 705/51 |
| 6,519,648 B1 | 2/2003 | Eyal | |
| 6,535,880 B1 | 3/2003 | Musgrove et al. | |
| 6,643,641 B1* | 11/2003 | Snyder | 707/709 |
| 6,714,933 B2 | 3/2004 | Musgrove et al. | |
| 6,721,741 B1 | 4/2004 | Eyal et al. | |
| 6,725,222 B1 | 4/2004 | Musgrove et al. | |
| 6,725,275 B2 | 4/2004 | Eyal | |
| 6,970,602 B1* | 11/2005 | Smith et al. | 382/232 |
| 7,013,310 B2* | 3/2006 | Messing et al. | 707/709 |
| 7,082,426 B2 | 7/2006 | Musgrove et al. | |
| 7,149,982 B1* | 12/2006 | Duperrouzel et al. | 715/788 |
| 7,162,696 B2 | 1/2007 | Wakefield | |
| 7,200,801 B2 | 4/2007 | Agassi et al. | |
| 7,231,381 B2* | 6/2007 | Li et al. | 707/766 |
| 7,251,790 B1* | 7/2007 | Drucker | G06F 17/30849 |
| | | | 348/333.05 |
| 7,269,330 B1 | 9/2007 | Iggulden | |
| 7,272,785 B2* | 9/2007 | Fukuda et al. | 715/234 |
| 7,281,034 B1 | 10/2007 | Eyal | |
| 7,451,391 B1* | 11/2008 | Coleman et al. | 715/234 |
| 7,584,194 B2* | 9/2009 | Tuttle et al. | |
| 7,685,273 B1 | 3/2010 | Anastas et al. | |
| 7,809,154 B2 | 10/2010 | Lienhart et al. | |
| 7,954,120 B2 | 5/2011 | Roberts et al. | |
| 8,019,162 B2* | 9/2011 | Zhang | H04N 21/478 |
| | | | 382/199 |
| 8,196,164 B1 | 6/2012 | Oztaskent et al. | |
| 8,290,351 B2 | 10/2012 | Plotnick et al. | |
| 8,572,505 B2 | 10/2013 | Lee et al. | |
| 8,650,587 B2 | 2/2014 | Bhatia et al. | |
| 2002/0023271 A1* | 2/2002 | Augenbraun et al. | 725/109 |
| 2002/0056089 A1 | 5/2002 | Houston | |
| 2002/0063727 A1 | 5/2002 | Markel | |
| 2002/0080165 A1* | 6/2002 | Wakefield | G06Q 30/02 |
| | | | 715/738 |
| 2002/0091764 A1 | 7/2002 | Yale | |
| 2002/0114002 A1 | 8/2002 | Mitsubori et al. | |
| 2003/0004272 A1* | 1/2003 | Power | H04L 29/06 |
| | | | 525/192 |
| 2003/0066070 A1 | 4/2003 | Houston | |
| 2003/0237027 A1* | 12/2003 | Cook | 714/38 |
| 2004/0003102 A1 | 1/2004 | DuVall et al. | |
| 2004/0145778 A1* | 7/2004 | Aoki et al. | 358/1.15 |
| 2004/0177096 A1 | 9/2004 | Eyal et al. | |
| 2004/0221311 A1 | 11/2004 | Dow et al. | |
| 2004/0254956 A1 | 12/2004 | Volk | |
| 2004/0254958 A1 | 12/2004 | Volk | |
| 2004/0267812 A1 | 12/2004 | Harris et al. | |
| 2005/0041858 A1 | 2/2005 | Celi, Jr. et al. | |
| 2005/0231648 A1* | 10/2005 | Kitamura et al. | 348/734 |
| 2006/0015571 A1 | 1/2006 | Fukuda et al. | |
| 2006/0026162 A1 | 2/2006 | Salmonsen et al. | |
| 2006/0041589 A1 | 2/2006 | Helfman et al. | |
| 2006/0120590 A1 | 6/2006 | Han et al. | |
| 2006/0120692 A1* | 6/2006 | Fukuta | G11B 27/105 |
| | | | 386/230 |
| 2006/0230011 A1 | 10/2006 | Tuttle et al. | |
| 2006/0242192 A1 | 10/2006 | Musgrove et al. | |
| 2006/0259938 A1* | 11/2006 | Kinoshita et al. | 725/118 |
| 2006/0271977 A1 | 11/2006 | Lerman et al. | |
| 2006/0282494 A1 | 12/2006 | Sima et al. | |
| 2007/0047766 A1* | 3/2007 | Rhoads | 382/100 |
| 2007/0073758 A1 | 3/2007 | Perry et al. | |
| 2007/0124110 A1 | 5/2007 | Tung | |
| 2007/0130525 A1 | 6/2007 | Murphy et al. | |
| 2007/0150612 A1 | 6/2007 | Chanay et al. | |
| 2007/0168543 A1 | 7/2007 | Krikorian et al. | |
| 2007/0172155 A1* | 7/2007 | Guckenberger | 382/305 |
| 2007/0237426 A1* | 10/2007 | Xie et al. | 382/305 |
| 2007/0239839 A1* | 10/2007 | Buday et al. | 709/208 |
| 2007/0271300 A1* | 11/2007 | Ramaswamy | 707/104.1 |
| 2007/0277088 A1 | 11/2007 | Bodin et al. | |
| 2007/0294252 A1 | 12/2007 | Fetterly et al. | |
| 2008/0034306 A1* | 2/2008 | Ording | G06F 3/04817 |
| | | | 715/764 |
| 2008/0046562 A1 | 2/2008 | Butler | |
| 2008/0046738 A1 | 2/2008 | Galloway et al. | |
| 2008/0082426 A1 | 4/2008 | Gokturk et al. | |
| 2008/0089666 A1* | 4/2008 | Aman | 386/95 |
| 2008/0109724 A1* | 5/2008 | Gallmeier | G06F 3/017 |
| | | | 715/716 |
| 2008/0120420 A1 | 5/2008 | Sima et al. | |
| 2008/0140712 A1 | 6/2008 | Weber et al. | |
| 2008/0141162 A1 | 6/2008 | Bockus | |
| 2008/0222273 A1 | 9/2008 | Lakshmanan et al. | |
| 2008/0229240 A1* | 9/2008 | Garbow et al. | 715/810 |
| 2008/0229427 A1* | 9/2008 | Ramirez | 726/26 |
| 2008/0294981 A1* | 11/2008 | Balzano et al. | 715/256 |
| 2008/0313177 A1* | 12/2008 | Li et al. | 707/5 |
| 2008/0319844 A1* | 12/2008 | Hua et al. | 705/14 |
| 2009/0047000 A1* | 2/2009 | Walikis | G06F 17/30053 |
| | | | 386/238 |
| 2009/0109337 A1* | 4/2009 | Imai | G06F 17/30905 |
| | | | 348/564 |
| 2009/0172723 A1 | 7/2009 | Shkedi et al. | |
| 2009/0222754 A1* | 9/2009 | Phillips et al. | 715/774 |
| 2009/0248672 A1* | 10/2009 | McIntire et al. | 707/5 |
| 2009/0254553 A1* | 10/2009 | Weiskopf et al. | 707/6 |
| 2009/0259926 A1 | 10/2009 | Deliyannis | |
| 2009/0268261 A1* | 10/2009 | Banton et al. | 358/474 |
| 2009/0291665 A1 | 11/2009 | Gaskarth et al. | |
| 2010/0023660 A1 | 1/2010 | Liu | |
| 2010/0080411 A1* | 4/2010 | Deliyannis | 382/100 |
| 2010/0162301 A1 | 6/2010 | Minnick | |
| 2010/0174983 A1 | 7/2010 | Levy et al. | |
| 2011/0122939 A1 | 5/2011 | Ganesan et al. | |
| 2011/0283311 A1 | 11/2011 | Luong | |
| 2012/0047010 A1 | 2/2012 | Dowling et al. | |
| 2012/0047234 A1* | 2/2012 | Terayoko | G06F 17/30905 |
| | | | 709/219 |
| 2012/0109743 A1 | 5/2012 | Balakrishnan et al. | |
| 2012/0304223 A1 | 11/2012 | Sargent et al. | |
| 2013/0090097 A1 | 4/2013 | Klassen et al. | |
| 2013/0097702 A1* | 4/2013 | Alhamed | G06F 21/64 |
| | | | 726/22 |
| 2013/0173402 A1 | 7/2013 | Young et al. | |
| 2014/0155022 A1 | 6/2014 | Kandregula | |
| 2014/0281980 A1 | 9/2014 | Hage | |
| 2015/0039637 A1 | 2/2015 | Neuhauser et al. | |
| 2015/0156332 A1 | 6/2015 | Kandregula | |

FOREIGN PATENT DOCUMENTS

| | | |
|---|---|---|
| JP | 2008171039 | 7/2008 |
| WO | WO9827497 | 6/1998 |
| WO | 0247467 | 6/2002 |
| WO | 2005043288 | 5/2005 |
| WO | 2005086081 | 9/2005 |
| WO | WO2006058075 | 6/2006 |
| WO | 2007018102 | 2/2007 |
| WO | 2007041647 | 4/2007 |
| WO | WO2008021459 | 2/2008 |

OTHER PUBLICATIONS

Buscher et al., "Generating and Using Gaze-Based Document Annotations," CHI 2008 Proceedings—Works in Progress, Apr. 5-10, 2008, Florence, Italy, pp. 3045-3050.

Fu et al., "Detecting Phishing Web Pages with Visual Similarity Assessment Based on Earth Mover's Distance (EMD)," IEEE Transactions on Dependable and Secure Computing, vol. 3, No. 4, Oct.-Dec. 2006, 11 pages.

International Search Report corresponding to International Patent Application No. PCT/US2008/059783, mailed Aug. 13, 2008, 6 pages.

Written Opinion of the International Searching Authority corresponding to International Patent Application No. PCT/US2008/059783, mailed Aug. 13, 2008, 6 pages.

(56) References Cited

OTHER PUBLICATIONS

The International Bureau, "International Preliminary Report on Patentability," issued in connection with counterpart international application No. PCT/US2008/059783, mailed Oct. 21, 2010 (7 pages).
Australian Government, "Examiner's First Report on Patent Application No. 2008354332", Jul. 26, 2011, (2 pages).
United States Patent and Trademark Office, "Final Office Action", issued in connection with U.S. Appl. No. 12/240,756, Jun. 24, 2011 (20 pages).
Australian Government, "Examiners First Report on Patent Application No. 2008354332", Jul. 26, 2011, (2 pages).
United States Patent and Trademark Office, "Advisory Action", issued in connection with U.S. Appl. No. 12/240,756, Nov. 1, 2011, (13 pages).
Canadian Intellectual Property Office, "Requisition by the Examiner", issued in connection with Patent Application No. 2,680,955, Oct. 5, 2011, 3 pages.
Chinese State Intellectual Property Office, "First Office action" issued in connection with Patent Application No. 2009102214165, Nov. 30, 2011, 5 pages.
Australian Government, "Examiner's First Report", issued in connection with Patent Application No. 2009222570, May 3, 2010, 1 page.
Australian Government, "Examiner's Report No. 2", issued in connection with Patent Application No. 2009222570, Jun. 6, 2011, 1 page.
Australian Government, "Notice of Acceptance", issued in connection with Patent Application No. 2008354332, Apr. 5, 2013, 2 pages.
Australian Government "Examiner's Report", issued in connection with Patent Application No. 2011239269, Feb. 6, 2013, 3 pages.
Canadian Intellectual Property Office, "Office Action", issued in connection with Patent Application No. 2,680,955, Sep. 27, 2012, 4 pages.
Chinese State Intellectual Property Office, "Second Office Action", issued in connection with Patent Application No. 2009102214165, Aug. 23, 2012, 17 pages.
Chinese State Intellectual Property Office, "Third Office Action", issued in connection with Patent Application No. 2009102214165, May 17, 2013, 9 pages.
Japanese Patent Office, "Office Action", issued in connection with Application No. 2011-503955, May 14, 2012, 5 pages.
Japanese Patent Office, "Second Office Action", issued in connection with Application No. 2011-503955, Mar. 19, 2013, 4 pages.
Canadian Intellectual Property Office, "Office Action," issued in connection with Application No. 2,680,955, on Nov. 13, 2013, 3 pages.
IP Australia, "First Examination Report," issued in connection with Application No. 2011239269 on Feb. 14, 2013, 5 pages.
United States Patent and Trademark Office, "Non-Final Office Action," issued in connection with U.S. Appl. No. 12/240,756, Feb. 22, 2011, 36 pages.
United States Patent and Trademark Office, "Non-Final Office Action," issued in connection with U.S. Appl. No. 12/240,756, Apr. 1, 2014, 45 pages.
Japanese Patent Office, "Decision of Rejection," issued in connection with Application No. 2011-503955, Aug. 13, 2013, 3 pages.
United States Patent and Trademark Office, "Final Office Action," issued in connection with U.S. Appl. No. 12/240,756, Dec. 17, 2014, 49 pages.
Canadian Intellectual Property Office, "Office Action," issued in connection with Application No. 2,680,955, Dec. 15, 2014, 6 pages.
United States Patent and Trademark Office, "Non-Final Office Action," issued in connection with U.S. Appl. No. 13/706,244, Mar. 25, 2014, 25 pages.
United States Patent and Trademark Office, "Final Office Action," issued in connection with U.S. Appl. No. 13/706,244, Sep. 12, 2014, 53 pages.
United States Patent and Trademark Office, "Advisory Action," issued in connection with U.S. Appl. No. 13/706,244, Feb. 17, 2015, 8 pages.
IP Australia, "Patent Examination Report No. 1," issued in connection with Application No. 2013203736, Oct. 20, 2014, 2 pages.
IP Australia, "Notice of Acceptance," issued in connection with Application No. 2011239269, Oct. 15, 2014, 2 pages.
United States Patent and Trademark Office, "Final Office Action," issued in connection with U.S. Appl. No. 13/840,807, mailed on Aug. 5, 2016, 18 pages.
Chinese Intellectual Property Office, "Second Office Action", issued in connection with Chinese Patent Application No. 2009102214165, issued on Aug. 23, 2013, 17 pages.
Australian Patent Office, "Notice of Grant," issued in connection with Australian Application No. 2011239269, issued on Feb. 12, 2015, 2 pages.
United States Patent and Trademark Office, "Non-Final Office Action," issued in connection with U.S. Appl. No. 13/840,807, mailed on Feb. 26, 2015, 37 pages.
United States Patent and Trademark Office, "Non-Final Office Action," issued in connection with U.S. Appl. No. 14/621,010, mailed on Mar. 17, 2015, 35 pages.
United States Patent and Trademark Office, "Final Office Action," issued in connection with U.S. Appl. No. 13/840,807, mailed on Jul. 8, 2015, 26 pages.
United States Patent and Trademark Office, "Non-Final Office Action," issued in connection with U.S. Appl. No. 13/955,163, mailed on Aug. 13, 2015, 27 pages.
United States Patent and Trademark Office, "Final Office Action," issued in connection with U.S. Appl. No. 13/955,163, mailed on Mar. 1, 2016, 17 pages.
Australian Patent Office, "Notice of Acceptance," issued in connection with Australian Application No. 2013203736, issued on Nov. 13, 2015, 2 pages.
Australian Patent Office, "Notice of Grant", issued in connection with Australian Patent Application No. 2008354332, issued on Aug. 1, 2013, 2 pages.
European Patent Office, "Communication pursuant to Rules 161(1) and 162 EPC," issued in connection with European Patent Application No. 08745395.7, issued on Jan. 12, 2011, 2 pages.
United States Patent and Trademark Office, "Non-Final Office Action," issued in connection with U.S. Appl. No. 13/840,807, mailed on Mar. 24, 2016, 19 pages.
Australian Intellectual Property Office, "Notice of Grant," issued in connection with Australian Patent Application No. 2013203736, issued on Mar. 23, 2016, 1 page.
United States Patent and Trademark Office, "Non-Final Office Action," issued in connection with U.S. Appl. No. 13/955,163, mailed on Jun. 27, 2016, 31 pages.
United States Patent and Trademark Office, "Final Office Action," issued in connection with U.S. Appl. No. 13/955,163, mailed on Dec. 23, 2016, 35 pages.
United States Patent and Trademark Office, "Notice of Panel Decision," issued in connection with U.S Appl. No. 13/840,807, mailed on Jan. 19, 2017, 2 pages.

\* cited by examiner

METHODS AND APPARATUS TO PLAY AND CONTROL PLAYING OF MEDIA IN A WEB PAGE

FIELD OF THE DISCLOSURE

This disclosure relates generally to web crawling and, more particularly, to methods and apparatus to play and control playing of media content in a web page.

BACKGROUND

As the World Wide Web proliferates and consumer bandwidth grows, the use of web pages to deliver media content also increases. Media content, such as audio and/or video content, is presented to web page viewers using several different formats and/or media players. Example media players that are currently used include Windows Media Player®, Quicktime®, RealPlayer®, and Flash Player®. Each media player has a different set of controls for a web page viewer to manipulate the playing of a video, and some media players even have multiple versions for different web browser applications.

DETAILED DESCRIPTION

Figure 1A:
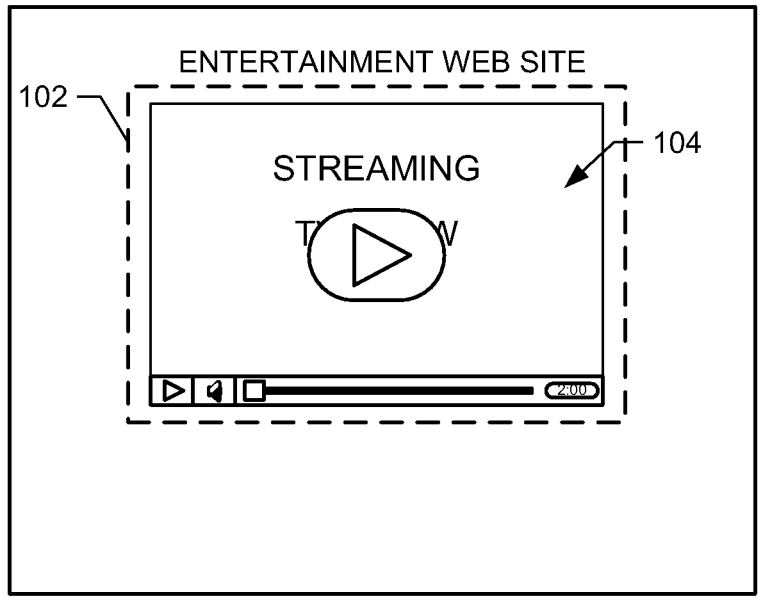
FIGS. 1A and 1B are example web pages containing media players and media content.

Although the example systems described herein include, among other components, software executed on hardware, such apparatus is merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

In general, the example methods and apparatus described herein may be used to play and monitor playing of media content in a web page. An example web crawler to play and control playing of media content in a web page described herein includes a web browser, an image generator, an image analyzer, a media player controller, and a signature generator.

In operation, the web browser loads a web page containing a media player. Information describing the web page layout is then sent to the image generator, which generates images of the web page as if the web page were displayed on, for example, a monitor. The image analyzer then uses image processing techniques to analyze the images of the web page to identify the media player and media content to be played by the media player. While identifying the media player, the image analyzer identifies media player controls (e.g., a play button) that a person viewing a web page could use to control playing of the media content. The image analyzer also identifies the area displaying the media content as well as various states of the media player, such as playing the media content or data buffering the media content.

Information describing the media player controls and states of the media player are used by the media player controller to control the media player, which operates in the web browser. For example, the media player controller may send a play command to the web browser to simulate a person viewing the web page clicking on the play button of the media player. Additionally, the signature generator uses media information to generate a digital signature of the media content. The digital signature may then be used by a media content identifier in conjunction with a database of digital signatures corresponding to known media content to identify some or all of the media content in the web page.

An example process to play and monitor playing of media content in a web page is also described. The example process may be implemented using, for example, the example web crawler described herein. The web crawler loads a web page having one or more media players and media content, generates images of the web page, and analyzes the images to determine the locations and functions of the media content and media player user controls. When the media players, media content, and user controls have been identified, the web crawler initiates playing of the media content (if playing has not automatically started) and generates a digital signature of the media content. While the media content is being played, the web crawler also monitors for various states of the media player, including playing the media content, paused media content, stopped media content, finished media content, data buffering the media content, and/or a media player error.

Although some of the following examples describe methods and apparatus to play and monitor the state one media player having media content in the example web page, it is noted that the methods and apparatus are also applicable to web pages having multiple media players and media content.

FIG. 1A is an example web page 100 containing a media player 102 and media content 104. The web page 100 is displayed when a user navigates to a web site (e.g., via a uniform resource locator) and downloads the web page 100 from the web site to a computer (e.g., the example computer described in FIG. 9). Web pages, in general, are described using hypertext markup language (HTML), extensible markup language (XML), and other computer languages, and are downloaded and displayed using web browsers. Example known web browsers include Microsoft® Internet Explorer®, Mozilla® Firefox®, and Apple® Safari®.

The example web page 100 includes the media content 104 in the description of the web page 100 and, thus, is downloaded and displayed with other contents of the web page 100 in the web browser. Alternatively, the description of the web page 100 may point to a location of the media content that is different than the location of the web page 100. Further, the media player 102 may also be downloaded with the web page 100 or, as is typical, may previously exist on the computer (e.g., as a browser plug-in) and be invoked by the web browser. The media player 102 is configured to play the media content 104, which has a particular type of data format to play on the media player 102. Different media players may play media content of different formats, or a media player may play any or all formats for media content. Different web pages and web sites may use different media players such that each media player may support different or the same media formats and/or have different or the same control programming to allow a user (e.g., a person browsing the web) to manipulate the media players. Further, some web pages may begin to play media content when the web page loads with no interaction or input required from the user.

Figure 1B:
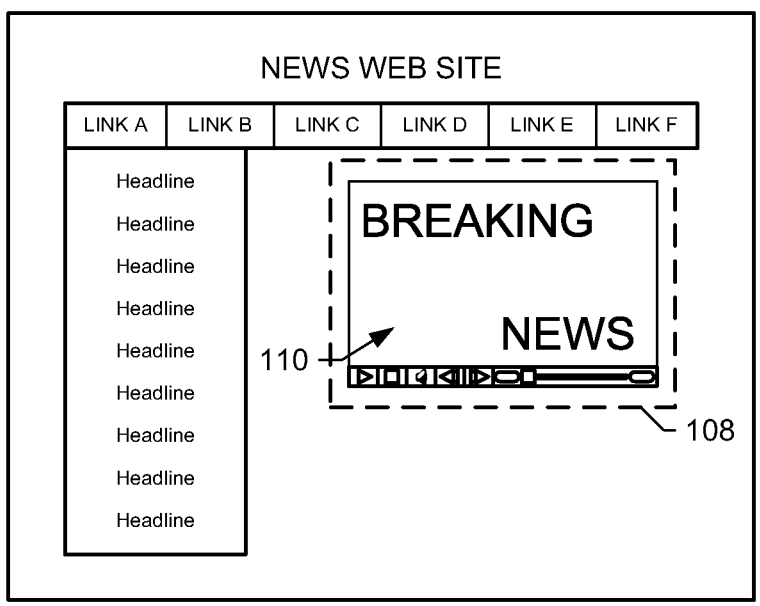

FIG. 1B is another example web page 106 containing a media player 108 and media content 110. The media player 108 is different than the media player 102. In particular, the user controls of the media players 102 and 108 are different. Further, some of the controls of the media players 102 and 108 are similar in function and some controls included in the media player 108 are not included in the other media player. Further, the formats of the media content 104 and 110 may be the same, similar or different. In general, example methods and apparatus described herein may be used to recognize the user controls of one or more media players 102, 108 on a web page 100, 106 and utilize the recognized controls to control playing of the media content 104, 110 associated with each media player 102, 108.

Figure 2:
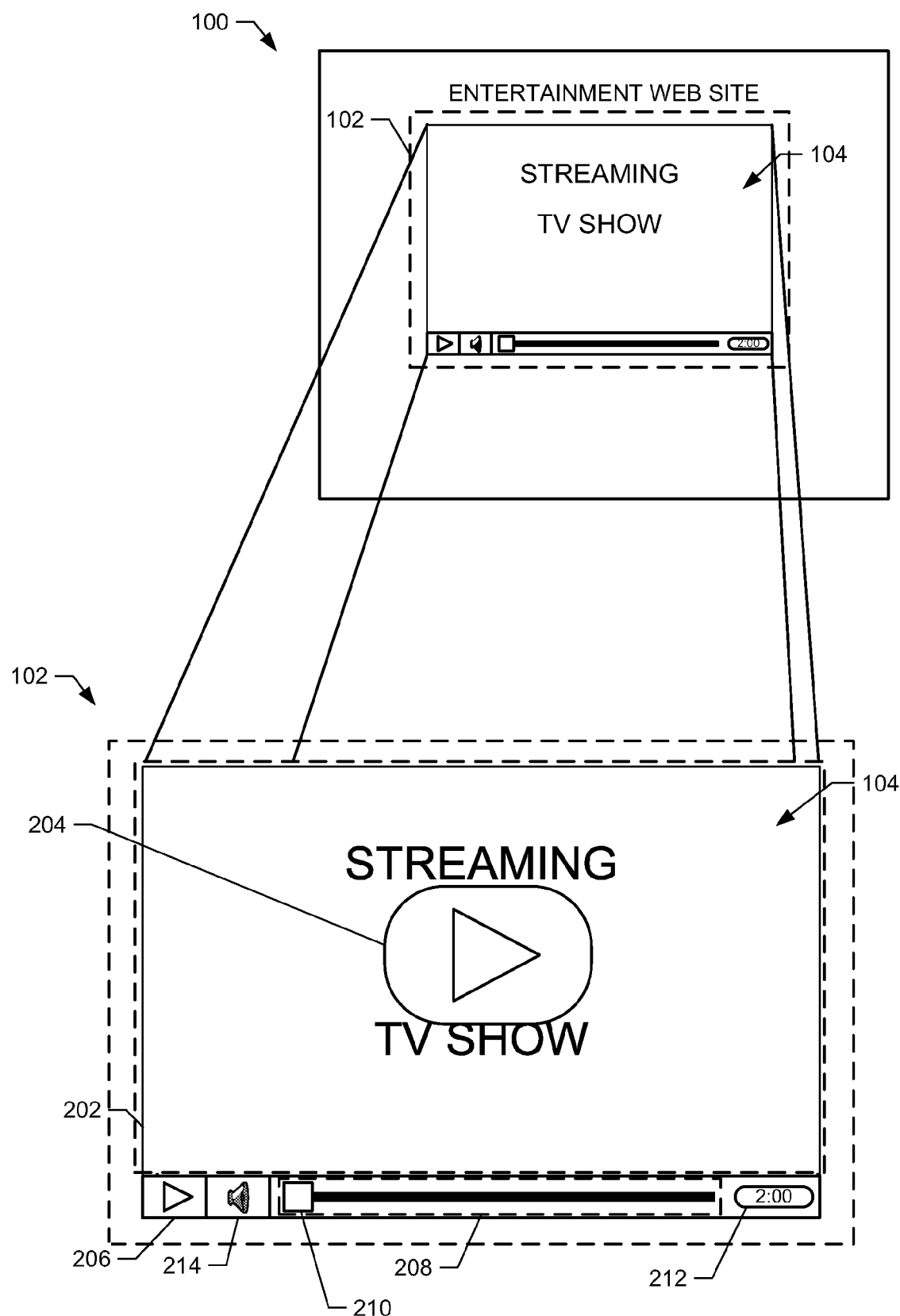
FIG. 2 is a more detailed view of the example media player and the example media content of FIG. 1A.

FIG. 2 is a more detailed view of the example media player 102 and the example media content 104 from the web page 100 of FIG. 1. The example media player 102 includes a media content area 202, which displays the media content 104 (e.g., video content) therein. The media player 102 further includes a play button 204 and a play/pause button 206. The play button 204 is displayed at the start of playing of the media content 104 (i.e., before playing begins) and disappears when the media content 104 is playing. The play/pause button 206 displays a play symbol when the media content 104 is not playing (e.g., when the media content 104 is paused or stopped) and a pause symbol (not shown) when the media content 104 is playing or buffering.

The example media player 102 also includes a progress bar 208, which displays to a user the current location (e.g., time, frame, etc.) of the media content 104 with respect to the beginning (the far left side of the progress bar 208) and end (the far right side of the progress bar 208) of the media content 104 using a progress bar indicator 210. In this example, a countdown timer 212 is also included, which displays the remaining time play of the media content 104 when played at a predetermined speed. However, a count up timer may also be used independently or in conjunction with a play time indicator (e.g., the countdown timer 212) to display the play time of the media content 104 relative to the beginning and/or the end of the media content 104. Finally, the example media player 102 includes a volume control 214 to control the output level of any audio content that may be part of the media content 104.

Although the example media player 102 includes only a play/pause button 204, a play button 206, a progress bar 208, a progress bar indicator 210, a countdown timer 212, and a volume control 214, any number or type of media player user controls may be provided to control the playing of the media content 104. Example controls that may be used in addition to and/or as an alternative to the controls 204-214 include a dedicated pause button, a stop button, a play/stop button, a media size control, a fast forward button, a rewind button, a time elapsed indicator, a countdown indicator, or a time elapsed/total time indicator.

Figure 3:
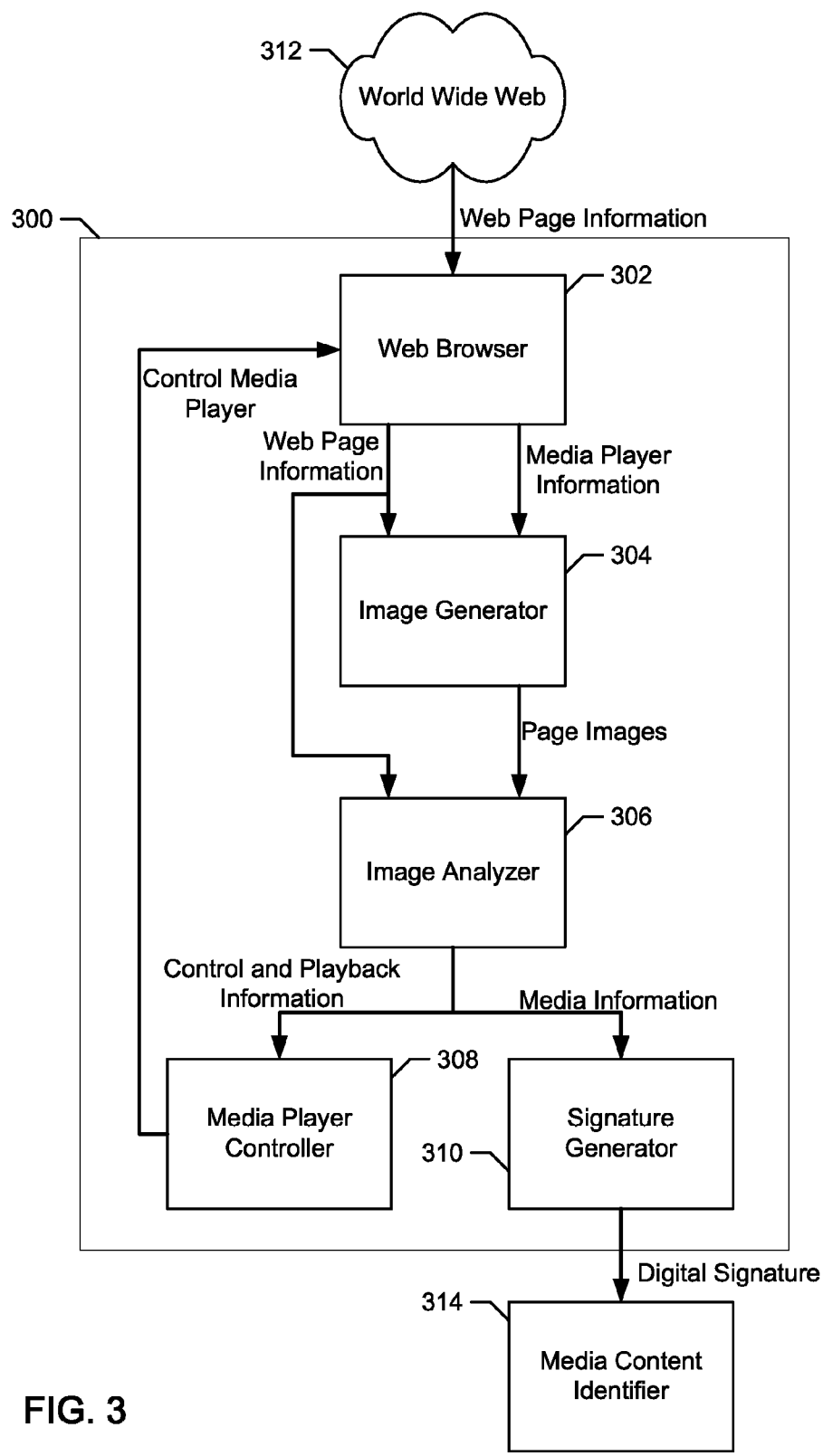
FIG. 3 is a block diagram of an example web crawler to play and monitor playing of media content in a web page.

FIG. 3 is a block diagram of an example web crawler 300 to play and monitor playing of media content on a web page. The example web crawler includes a web browser 302, an image generator 304, an image analyzer 306, a media player controller 308, and a signature generator 310. The web crawler 300 is coupled to the World Wide Web 312 (i.e., the Internet), from which the web crawler 300 receives web pages from any number of web sites. The web crawler 300 may be implemented, for example, as a software module on a processing platform (e.g., the example processor system described in FIG. 9).

To play and monitor playing of media content (e.g., the example media content 104 of FIG. 1) on a web page (e.g., the example web page 100 of FIG. 1), the web browser 302 receives and/or loads web page information describing the web page 100 from the World Wide Web 312. The web page information may be HTML code, XML code, Javascript code, and/or any other codes and/or computer languages used to describe the web page 100. The web browser 302 may be, for example, Internet Explorer® or any other commercial or custom web browser software capable of executing web page information.

When the web page 100 has a media player therein (e.g., the media player 102 of FIG. 1), the web browser 302 runs and/or operates the media player 102 and the media content 104 associated with the media player 102. Running the media player 102 and/or the media content 104 may be accomplished by native operation within the web browser 302, or may additionally or alternatively be accomplished via a browser plug-in (i.e., a program that interacts with a host application to provide a specific function). The example web browser 302 passes the web page information to the image generator 304 and the image analyzer 306, and further passes media player and/or media content information to the image generator 304. Alternatively, the web page information may be sent by the World Wide Web 312 to the image analyzer 306 in parallel with the web browser 302.

The image generator 304 uses the web page information from the browser 302 to generate page images of the web page. Example page images represent the display that a web user would see on a monitor. The number of page images the image generator 304 generates may simulate the refresh rate of a computer monitor, a television, and/or another media device having a display. Alternatively, any number or rate of page images may be generated to allow the image analyzer 306 and signature generator 310 to detect media content and controls and generate digital signatures, respectively.

The image generator 304 outputs the generated page images to the image analyzer 306, which analyzes the page images using image processing methods to determine information about the web page and, more specifically, about the media player(s) 102 therein. For ease of discussion, this example will refer to an example web page 100 including one media player 102 having media content 104. However, as noted throughout this disclosure, the methods and apparatus described are also applicable to web pages having multiple media players. When the example web page 100 is loaded into the web browser 302, a page image for the initial state of the page is analyzed by the image analyzer 306 to determine the presence and location of the media player 102. To this end, the image analyzer 306 further attempts to recognize the media content area 202 and any media controls, such as a play button, a pause button, a stop button, a play/stop button, a play/pause button, a volume control, a progress bar, a media size control, a fast forward button, a rewind button, a time elapsed indicator, a countdown indicator, or a time elapsed/total time indicator. In another example, only certain controls are recognized and used, such as the play/pause button 206, the stop button, and the time elapsed/total time indicators.

The example image analyzer 306 uses image processing techniques including image matching with hints to identify the media player 102 and the media content area 202, and edge detection to identify the media controls. Hints are any information the example image analyzer 306 may use to identify the media player 102 and/or the media content area 202. Hints may be derived from, for example, HTML or other code received in the web page information, known coordinates, comparison of successive images, and/or relevant network traffic. An example of relevant network traffic may be the web browser 302 calling a plug-in (e.g., "Rectangle 20, 20, 100, 100").

The hints can be used to concentrate on a particular area (e.g., the media content area 202) when the media player 102 and media content area 202 have been identified. One such algorithm is described in Equation 1:

$$R(x, y) = \frac{sum_{x',y'}[T(x', y') \cdot I(x+x', y+y')]}{\sqrt{sum_{x',y'}T(x', y')^2 \cdot sum_{x',y'}I(x+x', y+y')^2}},$$ (Eq. 1)

wherein I denotes the web page image, T denotes a template, and R denotes the result. The summation of Equation 1 is performed over the template and/or over the image patch $x'=0 \ldots w-1$, $y'=0 \ldots h-1$ (where w is the width and h is the height of the template/image). Example image processing software is included in the OpenCV library. However, any image processing method, technique, and/or algorithm may be used in combination with or as a substitute for the example techniques.

In addition to determining the location of the media player 102, the location of the media content area 202, and locations and functions of the media controls, the example image analyzer 306 determines the state of the media player 102. Example states of the media player 102 include playing the media content 104, paused media content 104, stopped media content 104, finished media content 104, data buffering the media content 104, and a media player error.

The example media player state of paused media content exists when the media player 102 ceases actively playing the media content 104 and, if playing resumes, will resume playing the media content 104 from substantially the same location in the media content 104 where playing ceased (i.e., when the pause button is pressed).

The example media player state of stopped media content exists when the media player 102 ceases actively playing the media content 104 and, if playing resumes, will begin playing the media content 104 from the beginning of the media content 104.

The example media player state of finished media content exists when the media player 102 ceases actively playing the media content 104 at the end of the media content 104.

The example image analyzer 306 functionality described above allows the web crawler 300 to determine if playing of the media content 104 has already started, to start playing the media content 104, to detect the end of playing the media content 104, to detect paused media content 104, to detect data buffering of the media content 104, to stop playback of the media content 104, and to detect problems and/or errors during playing the media content 104.

The media player controller 308 receives user control information associated with the example media player 102 from the image analyzer 306. The user control information may include information such as the control function (e.g., play/pause), a location on the web page (e.g., in x,y coordinate format), and any conditions for use (e.g., when the media player 102 should begin playing the media content 104). To control the media player 102, the media player controller 308 sends commands, such as a mouse click at a particular location and/or a particular keystroke, to the web browser 302, which receives the commands as simulated user inputs. For example, the media player controller 308 may send a mouse click command to the web browser 302, which instructs the web browser 302 to click the area defined by the image analyzer 306 to be the play button 206. The click of the play button 204 begins playing the media content 104 in the media player 102. It is noted that any user interaction, gesture, and/or command may be simulated by the media player controller 308 and/or executed by the web browser 302.

The signature generator 310 receives media information and generates a digital signature of the media content 104 being played. The digital signature may be based on any algorithm to generate, for example, one or more values identifying the media content 104 from the audio content and/or video content within. The generated digital signature may then be used by a media content identifier 314 to identify the media content 104. In one example, identification is achieved by comparing at least a portion of the digital signature to a database of reference digital signatures corresponding to a library of reference media content. The media content identifier 314 compares the example digital signature to the reference digital signatures, and if one or more comparisons yield a similarity above a certain threshold, the media content 104 is identified with the highest similarity.

Some web pages that include media content have a media player that is configured to begin playing when the web page has loaded, partially or fully, into the web browser. The image analyzer 306 can determine if playing of the example media content 104 has started using methods including, but not limited to, looking for motion in the media content area 202, detecting audio, determining if the play/pause button 204 is in the pause position, or having prior knowledge that the example web page 100 automatically begins playing the media content 104. Looking for motion in the media content area 202 includes analyzing multiple web page images to determine if there are changes to the media content area 202. To detect audio, the example web crawler 300 detects audio output formats from the web browser 302 to a virtual and/or real audio device (not shown). To determine if the play/pause button 204 is in the pause position, the image analyzer 306 determines, for example, whether an area that previously hosted a play symbol (e.g., ▶) currently hosts a pause symbol (e.g., ∥). The web crawler 300 may also expect the media content 104 to begin playing automatically based on input from a user or other source.

If playing of the media content 104 does not begin automatically, or if the media content 104 is stopped or paused at any time, the web crawler 300 takes steps to play the media content 104. The image analyzer 306, after identifying the controls of the example media player 102, sends media player control information and playing information to the media player controller 308. The media player controller 308 uses the control and playing information to send commands to the web browser 302 and begin playing the media content 104.

To determine when playing of the media content 104 has ended, one or more of the following may be taken into consideration: the play/pause button 204 displays a play symbol, the play button 206 is visible, the progress indicator 210 is at the end of the progress bar 208 (e.g., the far right side), audio cannot be detected for a predefined length of time, the countdown timer 212 is at 0:00, the time elapsed indicator and total time indicator are equal, and/or there is no motion in the media content area 202. When playing has ended, the image analyzer 306 may signal the signature generator 310 that the media content 104 has completed playing. The signature generator 310, in turn, completes any final steps necessary to produce a digital signature for the media content 104.

By defining the state of paused media content to only occur from a command by the media player controller 308, the web crawler 300 may define and monitor a pause variable that changes when the media player controller 308 pauses and un-pauses the media content 104. The media player controller 308 may pause the media content 104 if, for example, there are multiple media players 102, 106 on the web page 100 and the signature generator 310 may only generate a signature for one media content at a time. As described below, a data buffering state changes to a state of playing the media content 104 when the data buffering is complete.

To avoid interruptions during playing of streaming media, media players typically buffer the media content data based on the connection speed, the total play time, and/or the time remaining for playing. The buffered length is an estimate of how much of a "head start" is necessary to play through the media without having play catch up with the downloaded data. For example, before playing begins the media player 102 buffers five seconds of media content 104 data before initiating playback of a 60-second clip of media content 104. The five seconds of data buffering is an estimate by the media player 102 that the remaining media content data can be downloaded in 55 seconds or less. However, a data connection supplying the media content 104 may have a delay, which causes the playing of the media content 104 to play all of the data available to the media player 102 before the end of the media content 104. Thus, playing cannot continue until more data is available, and the media player 102 must buffer the media content 104 data again. The example media player 102 displays the word "Buffering" in the media content area 202 to indicate the state of the media player 104 to the user as shown below in connection with FIG. 7.

To detect data buffering of the media content 104, the image analyzer 306 may consider one or more of the word "buffering" displayed within the media content area 202 and/or the control area, a lack of audio for a predefined length of time, the progress bar indicator 210 is not at the end of the progress bar 208 but has not moved in a predefined length of time, and/or any other indication that a particular web site may give to indicate a state of data buffering (e.g., a pop-up window).

During data buffering, the example media content 104 is not playing. As a result, any audio that is part of the media content 104 is not playing. Thus, the example web crawler 300 may monitor the audio output of the web browser 302 for further information about the status of the media player 102 and whether the media content 104 is data buffering. To monitor the progress bar indicator 210, the image analyzer 306 may compare successive or substantially successive web page images from the image generator 304 to determine whether the progress bar indicator 210 has moved. Further, the web page 100 and/or the media player 102 may present other indications that the media content 104 is being buffered, such as displaying a pop-up window. Any one or more of the above-described indications or other indications may be used to determine a state of data buffering of the media content 104 during playing.

To detect stopped media content, the web crawler 300 may consider one or more of the media player controller 308 pressing the stop button, the progress bar indicator 210 not moving in a predefined length of time and/or being at the end of the progress bar 208, and/or a lack of audio output from the web browser 302 for a certain amount of time.

The web crawler 300 may detect problems with playing by determining that the media content 104 begins playback successfully, and failing to determine the end of playback within a predefined length of time.

Although FIG. 3 illustrates an example implementation, it should be recognized by those of ordinary skill in the art that other implementations are possible and useful. For example, the inventive concepts described herein may be implemented as a software application to identify and monitor media content in a web page on a personal computer of a media research panelist. In such an implementation, the software may identify and monitor media content watched by one or more panelists using the personal computer.

Figure 4:
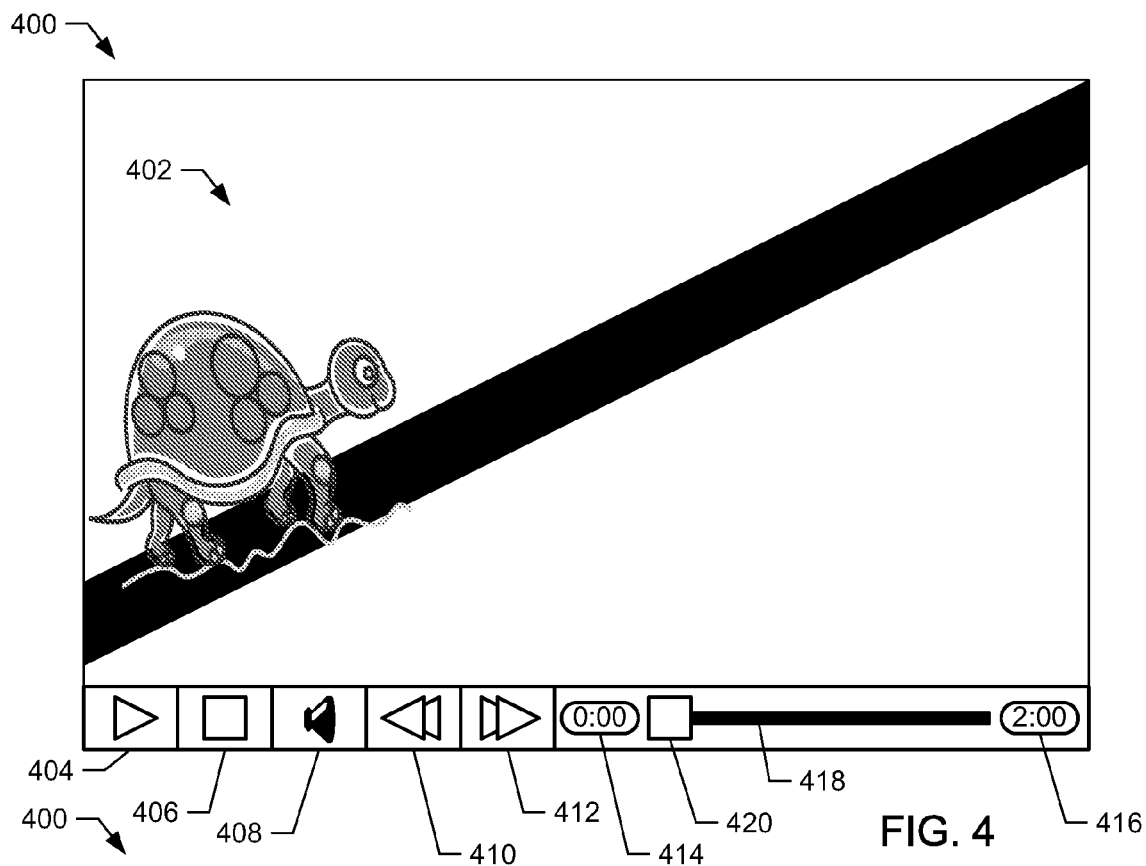
FIG. 4 is an illustration of an example media player that has not begun playing of media content.

FIG. 4 is an illustration of an example media player 400 that has not begun playing the media content 402. The example media content 402 is a 2:00 minute long video clip including audio. The example media player 400 includes user controls such as a play/pause button 404, a stop button 406, a volume control 408, a rewind button 410, a fast forward button 412, a time elapsed indicator 414, a total time indicator 416, a progress bar 418, and a progress bar indicator 420. Alternate configurations and controls are also within the scope of this disclosure. For example, the time elapsed indicator 414 and the total time indicator 416 may be replaced by the example time remaining indicator 212 described in FIG. 2.

As described above, the image analyzer 306 determines that playing of the example media content 402 has not started by observing the play/pause button 404, the time elapsed indicator 414, and the progress bar indicator 420. In this example, the play/pause button 404 is displaying the play symbol, the time elapsed indicator 414 is displaying 0:00, which indicates the media content 402 is at the beginning or substantially at the beginning, and the progress bar indicator 420 is at the start of the progress bar 418 (i.e., the left side of the progress bar 418).

Figure 5:
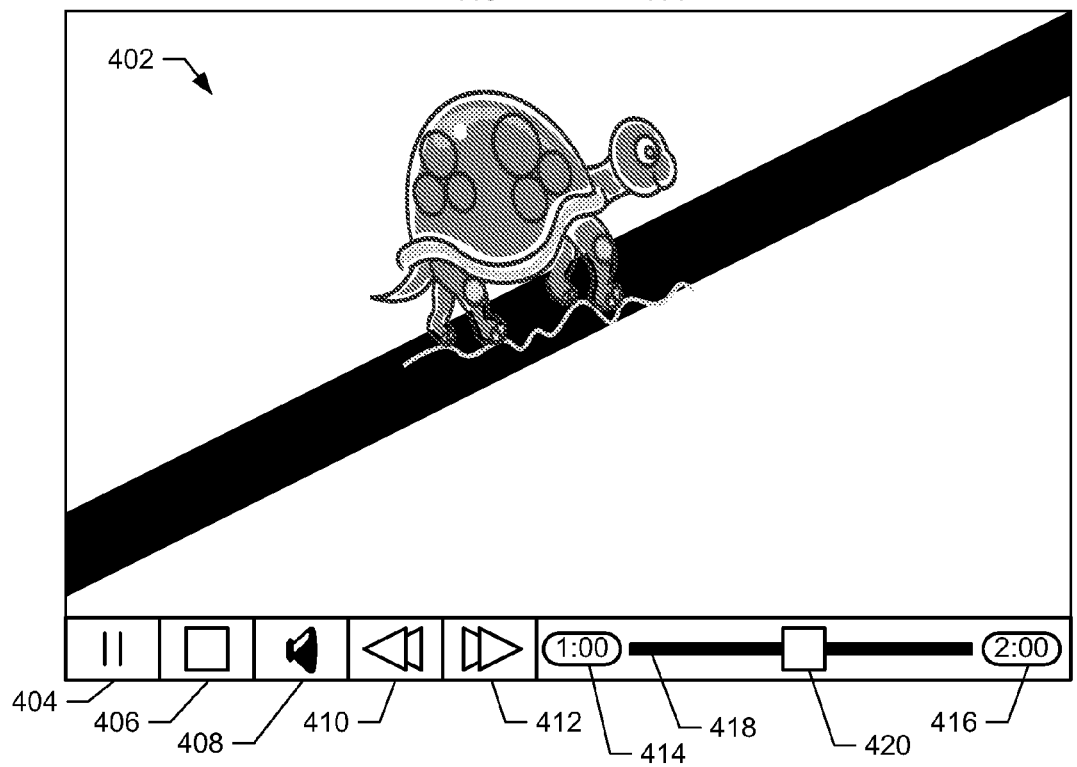
FIG. 5 is an illustration of an example media player that is playing media content.

FIG. 5 is an illustration of an example media player 400 that is playing the media content 402. The example media player 400 is configured to play the example media content 402 and includes the example user controls 404-420 as described in FIG. 4. In this example, the media player 400 is at 1:00 minute of play time while playing the media content 402. The image analyzer 306 determines that the media player 400 is playing back the media content 402 by detecting differences in multiple images of the media content 402, by observing that the play/pause button 404 is displaying a pause symbol, by observing the time elapsed indicator 414 displays a time that is not 0:00 and is not the total time, and/or by detecting differences in the location of the progress bar indicator 420. Any one or more of the above playing indicators may also be used in combination with detecting audio output associated with the media content 402.

Figure 6:
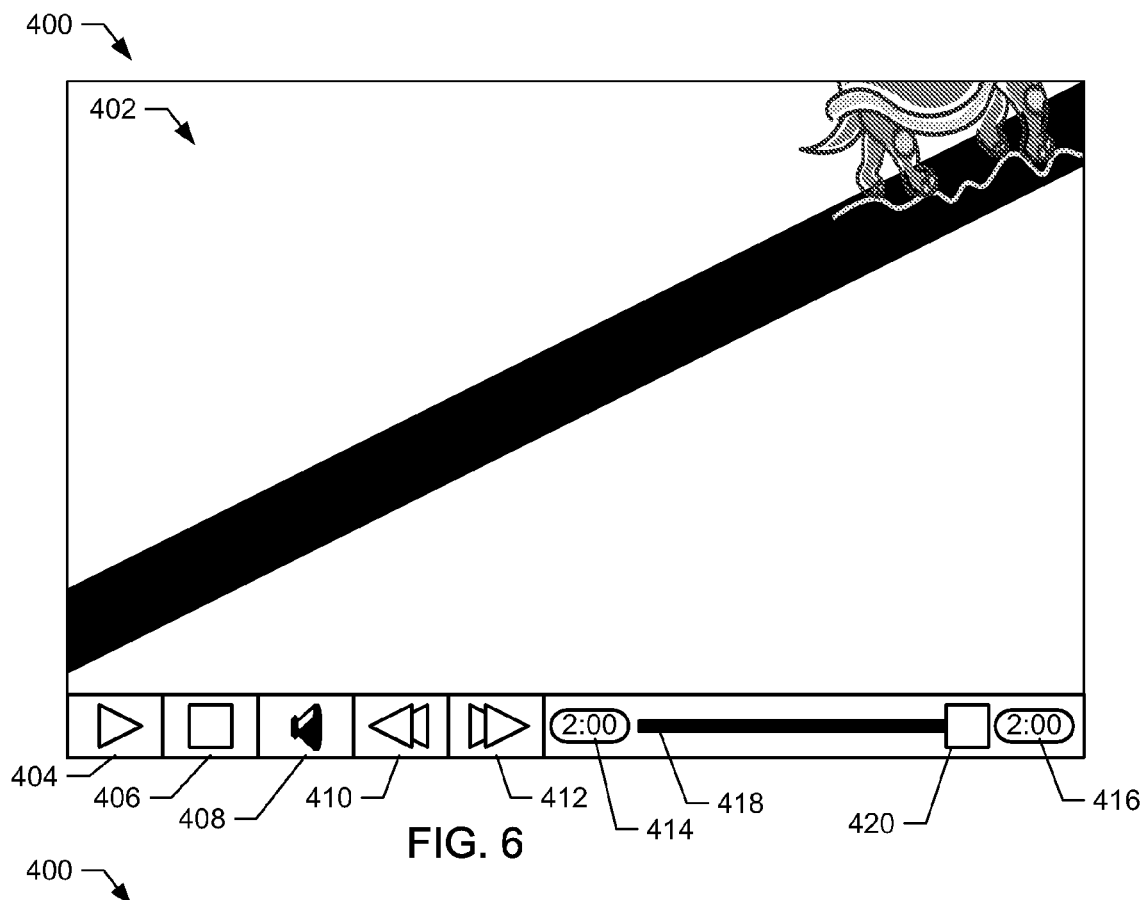
FIG. 6 is an illustration of an example media player that has finished playing of media content.

FIG. 6 is an illustration of an example media player 400 that has ended playing of the media content 402. The example media player 400 includes the example media content 402 and the example user controls 404-420 as described in FIG. 4. To determine that the media player 400 has ended playing of the media content 402, the image analyzer 306 analyzes consecutive or successive web page images to determine that there is no difference in the media content 402 and/or the progress bar indicator between consecutive or successive web page images, that the play/pause button 404 displays a play symbol, that the time elapsed indicator 414 displays the same time as the total time indicator 416, and/or that there is a lack of audio output for a predetermined length of time.

Figure 7:
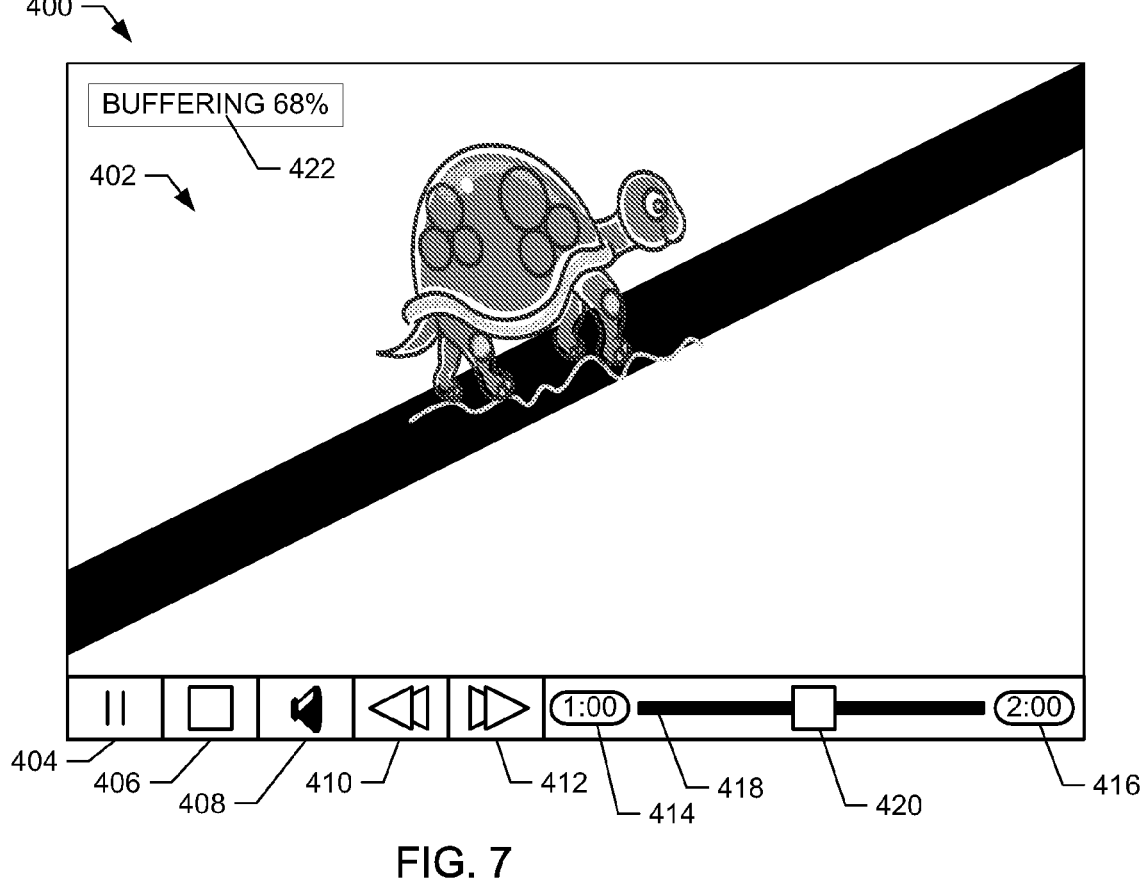
FIG. 7 is an illustration of an example media player that is buffering data associated with the media content.

FIG. 7 is an illustration of an example media player 400 that is buffering data associated with the media content 402. The example media player 400 includes the example media content 402 and the user controls 404-420. During data buffering, the media player 400 displays an alert 422, showing the word "buffering" over at least a portion of the media content 402. However, the alert 422 may be located anywhere in the example web page 100. The example alert 422 also includes the percentage of buffering completed, which can provide a user an estimate of how much time remains before the media player 400 completes the data buffering and begins or continues playing the media content 402. To determine that the media player 400 is data buffering the media content 402, the image analyzer 306 may consider one or more of detecting the alert 422 and/or the word "buffering" in the media player 400 and/or on the web page 100, failing to detect audio output for a predefined length of time, failing to detect a difference in the position of the progress bar indicator 420 in a predefined length of time, and/or any other indication that a particular web site may give to indicate that the media player 400 is data buffering.

Figure 8:
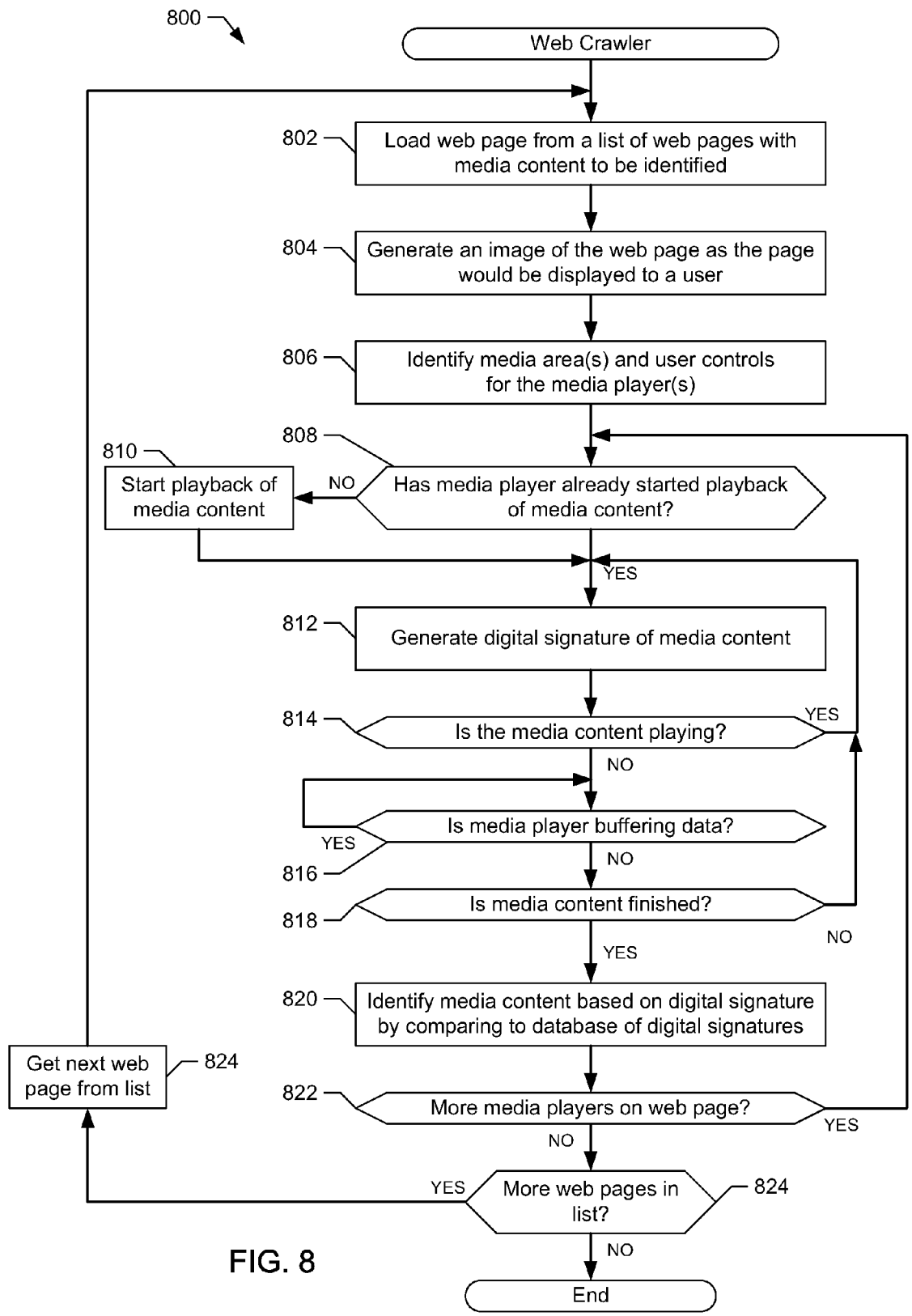
FIG. 8 is a flowchart representative of an example process to play and monitor playing of media content in a web page.

FIG. 8 is a flowchart representative of an example process 800 to play and monitor playing of media content 104 on a web page 100. The example process of FIG. 8 may be executed by a processor, a controller, and/or any other suitable processing device. For example, the example processes 800 of FIG. 8 may be implemented using coded instructions stored on a tangible medium such as a flash memory, or random access memory (RAM) associated with a processor (e.g., the processor 912 shown in the example processor platform 900 and discussed below in conjunction with FIG. 9). Alternatively, the example flowchart of FIG. 8 may be implemented using ASICs, programmable logic devices (PLD), field programmable logic devices (FPLD), discrete logic, hardware, firmware, etc. In addition, the example flowchart of FIG. 8 may be implemented manually or as a combination of any of the foregoing techniques such as, for example, a combination of firmware, software, and/or hardware. Further, although the example process of FIG. 8 is described with reference to the flowchart of FIG. 8, many other methods of implementing the example web crawler 300 of FIG. 3 may be employed. For example, the order of execution of the blocks may be changed, and/or some of the blocks described may be changed, eliminated, sub-divided, and/or combined. Additionally, the example process of FIG. 8 may be carried out sequentially and/or carried out in parallel by, for example, separate processing threads, processors, devices, circuits, etc.

Turning now to the example process 800, the web crawler 300 loads a web page (e.g., the example web page 100 of FIGS. 1 and 2) from a list of one or more web pages. Each web page on the list has one or more media players (e.g., the example media player 102 or 108 in FIGS. 1A-B and 2), each having media content (e.g., the example media content 104 or 110 in FIGS. 1A-B and 2) to be identified (block 802). The web crawler (via the image generator 304) generates an image of the web page 100 as the web page 100 would typically be displayed (e.g., on a display device) to a user (block 804).

The image analyzer 306 analyzes the image of the web page 100 to identify a media area (e.g., the media area 202 in FIG. 2) and any present user controls (block 806). To identify user controls, the example image analyzer 306 uses edge detection algorithms to determine patterns matching well-known symbols for user controls, such as play (▶), pause (∥), stop (■), fast forward ((▶▶)), rewind ((◀◀),), volume ((◀),), a progress bar, a progress bar indicator, and play timers. To identify the media area 200, the image analyzer 306 searches the image area near the controls. Additionally or alternatively, the web crawler 300 allows the media to play and the image analyzer 306 compares multiple web page images to determine in what areas the web page image changes. The example image processing techniques utilized herein may be replaced and/or modified by any other appropriate image processing technique and/or method.

Another example web page 100 may have multiple media players, each having distinct media content to be identified. In this case, the image analyzer 306 recognizes the media content areas 202 and user controls for the multiple media players. To avoid interference while the signature generator is generating digital signatures of the multiple media content, the media player controller 308 may command the web browser to stop one or more of the media players.

When the media content area 202 and the user controls are determined (block 806), the image analyzer 306 determines whether playing of the media content 104 has started (block 808). If the web crawler 300 has allowed the media content 104 to begin playing as described above, the image analyzer 306 determines that playing has started. If the web crawler 300 has not intentionally started playing the media content 104 (i.e., pressed a play button), the image analyzer 306 may determine whether playing of the media content 104 has started by looking for motion in the media content area 202, detecting audio, determining if the play/pause button 204 is in the pause position, or having prior knowledge that the example web page 100 automatically begins playing the media content 104 as described above. If the media player 102 has not started playing the media content 102, the web crawler 300 commands the web browser 302 to begin playing the media content 104 via the media player controller 308 (block 810).

When the media content 104 has begun playing, the image analyzer 306 analyzes successive web page images and sends media information to the signature generator 310. The signature generator receives the media information and generates a digital signature of the media content 104 based on the media information (block 812). Example media content 104 containing audio and video may have a digital signature based on the audio and/or the video.

While the image analyzer 306 analyzes the successive web page images to send media information to the signature generator, the image analyzer 306 monitors for various states of the media player 102. The image analyzer 306 first determines whether playing of the media content 104 has stopped (block 814) by monitoring for one or more of the following: the word "buffering" is displayed within the media content area 202 and/or the control area, audio cannot be detected for a predefined length of time, the progress bar indicator 210 has not moved in a predefined length of time, the play/pause button 204 displays a play symbol, the play button 206 is visible, the progress indicator 210 is at the end of the progress bar 208 (e.g., the right side), the countdown timer 212 is at 0:00, the time elapsed indicator 414 and total time indicator 416 are equal, motion cannot be detected in the media content area 202, and/or any other indication that a particular web site may provide to indicate a state of stopped media content 104. If playing of the media content 104 has not stopped, the process returns control to block 812 to enable the image analyzer 306 continues to analyze web page images and send media information to the signature generator 310.

If playing of the media content 104 has stopped, the image analyzer 306 determines whether the media player 102 is buffering the media content 104 by monitoring for one or more of the word "buffering" displayed within the media content area 202 and/or the control area, a lack of audio for a predefined length of time, the progress bar indicator 210 is not at the end of the progress bar 208 but has not moved in a predefined length of time, and/or any other indication that a particular web site may give to indicate a state of data buffering (block 816). If the image analyzer 306 determines that the media player 102 is buffering the media content 104, the image analyzer returns to block 812 to determine if the media content 104 is still being buffered.

If the image analyzer determines that the media player 102 is not buffering the media content 104, or after the buffering has completed, the image analyzer 306 determines whether the media player 102 has finished playing the media content 104 (block 818). If the media player 102 has not finished playing the media content 104, control returns to block 816 to continue generating the digital signature of the media content 104.

When the media content 104 has finished, the web crawler 300 identifies the media content 104 by comparing the digital signature to a database of digital signatures (block 820). Alternatively, the web crawler may store the digital signature to be compared later and/or transmit the digital signature to an external location to be identified. For example, the web crawler 300 may utilize the media identifier 316 described in FIG. 3 to identify the media content 104.

The web crawler 300 further determines whether there are more media players on the web page 100 (block 822). If there are additional media players having media content for which digital signatures have not been generated, control returns to block 808 to determine whether the media player 102 has already started playing the media content. When there are no additional media players having media content, control passes to block 824 to determine if there are any more web pages in the list. If there are more web pages, the web crawler 300 selects the next web page from the list (block 826) and control returns to block 802 to load the web page. When there are no more web pages on the list (block 824), the process may end.

Figure 9:
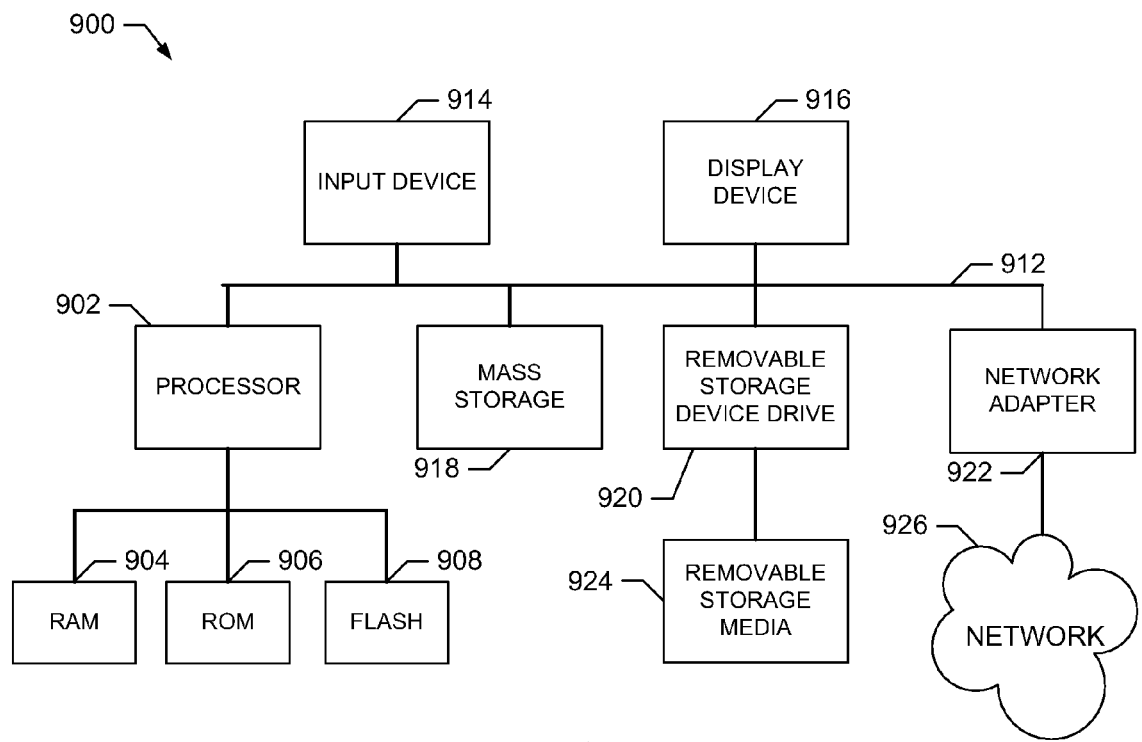
FIG. 9 is a diagram of an example processor system that may be used to implement the example methods and apparatus described herein.

FIG. 9 is a diagram of an example processor system 900 that may be used to implement the example process 800 described in FIG. 8, as well as the web crawler 300 described in FIG. 3. The example processor system 900 includes a processor 902 having associated memories, such as a random access memory (RAM) 904, a read only memory (ROM) 906 and a flash memory 908. The processor 902 is coupled to an interface, such as a bus 912 to which other components may be interfaced. In the illustrated example, the components interfaced to the bus 912 include an input device 914, a display device 916, a mass storage device 918, a removable storage device drive 920, and a network adapter 922. The removable storage device drive 920 may include associated removable storage media 924 such as magnetic or optical media. The network adapter 922 may connect the processor system 900 to an external network 926.

The example processor system 900 may be, for example, a conventional desktop personal computer, a notebook computer, a workstation or any other computing device. The processor 902 may be any type of processing unit, such as a microprocessor from the Intel® Pentium® family of microprocessors, the Intel® Itanium® family of microprocessors, and/or the Intel XScale® family of processors. The memories 904, 906 and 908 that are coupled to the processor 902 may be any suitable memory devices and may be sized to fit the storage demands of the system 900. In particular, the flash memory 908 may be a non-volatile memory that is accessed and erased on a block-by-block basis.

The input device 914 may be implemented using a keyboard, a mouse, a touch screen, a track pad, a barcode scanner or any other device that enables a user to provide information to the processor 902.

The display device 916 may be, for example, a liquid crystal display (LCD) monitor, a cathode ray tube (CRT) monitor or any other suitable device that acts as an interface between the processor 902 and a user. The display device 916 as pictured in FIG. 9 includes any additional hardware required to interface a display screen to the processor 902.

The mass storage device 918 may be, for example, a conventional hard drive or any other magnetic, optical, or solid state media that is readable by the processor 902.

The removable storage device drive 920 may, for example, be an optical drive, such as a compact disk-recordable (CD-R) drive, a compact disk-rewritable (CD-RW) drive, a digital versatile disk (DVD) drive or any other optical drive. It may alternatively be, for example, a magnetic media drive and/or a solid state universal serial bus (USB) storage drive. The removable storage media 924 is complimentary to the removable storage device drive 920, inasmuch as the media 924 is selected to operate with the drive 920. For example, if the removable storage device drive 920 is an optical drive, the removable storage media 924 may be a CD-R disk, a CD-RW disk, a DVD disk or any other suitable optical disk. On the other hand, if the removable storage device drive 920 is a magnetic media device, the removable storage media 924 may be, for example, a diskette or any other suitable magnetic storage media.

The network adapter 922 may be, for example, an Ethernet adapter, a wireless local area network (LAN) adapter, a telephony modem, or any other device that allows the processor system 900 to communicate with other processor systems over a network. The external network 926 may be a LAN, a wide area network (WAN), a wireless network, or any type of network capable of communicating with the processor system 900. Example networks may include the Internet, an intranet, and/or an ad hoc network.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of monitoring media in a web page, the method comprising:
   loading, by executing an instruction with a processor, a web page to a user device;
   generating, by executing the instruction with the processor, successive images of the web page as displayed on the user device;
   detecting, by executing the instruction with the processor, based on the successive images, a media player contained in the web page, a media content area associated with the media player for displaying the media, and a media control associated with the media player;
   comparing, by executing the instruction with the processor, the successive images to detect changes between the successive images indicative of motion in the media content area;
   analyzing, by executing the instruction with the processor, the successive images to determine a state of the media player;
   determining, by executing the instruction with the processor, whether the media player is playing the media based on the detected motion and the determined state of the media player;
   commanding, by executing the instruction with the processor, without user intervention, the media player to play the media when the media player is not playing the media;
   generating, by executing the instruction with the processor, based on first media information of the media displayed in the media content area, when the media is playing at a first time, a digital signature of the media;
   determining, by executing the instruction with the processor, based on the successive images, whether the media is finished playing;
   updating, by executing the instruction with the processor, based on second media information of the media displayed in the media content area, the generated digital signature when the media is not finished playing at a second time later than the first time; and
   comparing, by executing the instruction with the processor, the generated digital signature with a database of digital signatures to specifically identify the media when the media is finished playing.

2. The method as defined in claim 1, further including locating, based on the successive images, the media player in the web page.

3. The method as defined in claim 1, wherein the state of the media player is paused media.

4. The method as defined in claim 1, wherein the state of the media player is data buffering the media.

5. The method as defined in claim 1, wherein the state of the media player is a media player error.

6. The method as defined in claim 1, wherein determining, by executing the instruction with the processor, whether the media player is playing the media based on the detected motion and the determined state of the media player includes processing the successive images to
   locate at least an area in the media player that includes a first symbol; and
   determine whether the area previously included a second symbol.

7. A method of monitoring media in a web page, the method comprising:
   loading, by executing an instruction with a processor, the web page to a user device;
   generating, by executing the instruction with the processor, successive images of the web page as presented on the user device;
   analyzing, by executing the instruction with the processor, the successive images using an image processing technique to:
     detect a media player contained in the web page, a media content area associated with the media player for displaying the media, and a media control associated with the media player,
     detect changes between the successive images indicative of motion in the media content area,
     determine a state of the media player,
     determine, based on the detected motion and the determined state of the media player, whether the media player is playing media,
     command, without user intervention, the media player to play the media when the media player is not playing the media,
     generate, based on first media information of the media displayed in the media content area, when the media is playing at a first time, a digital signature of the media;
     determine whether the media is finished playing, and
     update the generated digital signature, based on second media information of the media displayed in the media content area, when the media is not finished playing at a second time later than the first time; and
   comparing, by executing the instruction with the processor, the generated digital signature with a database of reference digital signatures to specifically identify the media when the media is finished playing.

8. The method as defined in claim 7, wherein the image processing technique includes edge detection.

9. The method as defined in claim 7, wherein the media control includes one of a play button, a pause button, a stop button, a play/stop button, a play/pause button, a volume control, a progress bar, a media display size control, a fast forward button, a rewind button, a time elapsed indicator, a countdown indicator, or a time elapsed/total time indicator.

10. The method as defined in claim 1, wherein the media includes at least one of audio or video.

11. The method as defined in claim 7, wherein the state of the media player is pausing the media.

12. The method as defined in claim 1, wherein the state of the media player is data buffering the media.

13. An apparatus to monitor media in a web page, comprising:
    an image generator to generate successive images of a web page as presented on a user device;
    an image analyzer to compare the successive images to:
      detect a media player contained in the web page,
      detect a media control associated with the media player,
      detect a media content area associated with the media player for displaying the media,
      detect changes between the successive images indicative of motion in the media content area,
      determine a state of the media player,
      determine whether the media player is playing the media based on the detected changes and the determined state, command, without user intervention, the media player to play the media when the media player is not playing the media, and
determine whether the media is finished playing;
a signature generator to, when the media is not finished playing:
receive first media information of the media displayed in the media content area from the image analyzer;
generate a digital signature of the media, based on the received first media information, when the media is playing at a first time; and
update the generated digital signature, based on received second media information of the media displayed in the media content area, when the media is playing at a second time later than the first time; and
a media identifier to, when the media is finished playing to:
receive the generated digital signature from the signature generator,
compare the generated digital signature to a database of reference digital signatures corresponding to a library of reference media, and
identify the media, at least one of the image generator, the image analyzer, the signature generator, or the media identifier implemented using a processor.

14. The apparatus as defined in claim 13, further including a web browser to load the web page.

15. The apparatus as defined in claim 13, wherein the media control includes one of a play button, a pause button, a stop button, a play/stop button, a play/pause button, a volume control, a progress bar, a media display size control, a fast forward button, a rewind button, a time elapsed indicator, a countdown indicator, or a time elapsed/total time indicator.

16. The apparatus as defined in claim 13, wherein the state of the media player includes one of paused media, stopped media, data buffering media, or a media player error.

17. A computer readable storage disc or storage device, excluding propagating signals, comprising machine readable instructions which, when executed, cause a machine to at least:
load a web page to a user device;
generate successive images of the web page as presented on the user device;
analyze the successive images using an image processing technique to:
detect a media player contained in the web page, a media content area associated with the media player for displaying the media, and a media control associated with the media player,
detect changes between the successive images indicative of motion in the media content area,
determine a state of the media player,
determine, based on the detected motion and the determined state, whether the media player is playing media,
command, without user intervention, the media player to play the media when the media player is not playing the media,
generate, based on first media information of the media displayed in the media content area, a digital signature of the media when the media is playing at a first time;
determine whether the media is finished playing, and
update the generated digital signature of the media, based on second media information of the media displayed in the media content area, when the media is not finished playing at a second time later than the first time; and
compare the generated digital signature with a database of reference signatures to identify the media when the media is finished playing.

18. The computer readable storage disc or storage device as defined in claim 17, wherein the machine readable instructions further cause the machine to analyze the successive images to determine a location of the media player on the web page.

19. The computer readable storage disc or storage device as defined in claim 17, wherein the database of reference signatures corresponds to a library of reference media.

20. The computer readable storage disc or storage device as defined in claim 17, wherein the state of the media player includes one of pausing the media, stopping the media, data buffering the media, or a media player error.

21. The computer readable storage disc or storage device as defined in claim 17, wherein the media control includes one of a play button, a pause button, a stop button, a play/stop button, a play/pause button, a volume control, a progress bar, a media display size control, a fast forward button, a rewind button, a time elapsed indicator, a countdown indicator, or a time elapsed/total time indicator.

22. The computer readable storage disc or storage device as defined in claim 17, wherein the media includes at least one of audio or video.

23. The computer readable storage disc or storage device as defined in claim 17, wherein the image processing technique includes successively comparing a first image, a second image, and a third image.

24. The computer readable storage disc or storage device as defined in claim 17, wherein the machine readable instructions further cause the machine to generate the successive images at a rate substantially equal to a refresh rate of a display of the machine.

25. A method of monitoring media in a web page, comprising:
loading, by executing an instruction with a processor, a web page to a user device;
generating, by executing the instruction with the processor, successive images of the web page as presented on the user device;
analyzing, by executing the instruction with the processor, the successive images using an image processing technique to detect a media player contained in the web page, detect a media content area associated with the media player for displaying the media, detect a media control associated with the media player, detect changes between the successive images indicative of motion in the media content area, determine a state of the media player, determine whether the media player is playing media based on the detected motion and the determined state, command the media player to play the media when the media player is not playing the media without user intervention, and determine whether the media is finished playing;
generating, by executing the instruction with the processor, a digital signature of the media, based on first media information of the media displayed in the media content area, when the media is playing at a first time;
updating, by executing the instruction with the processor, the generated digital signature, based on second media information of the media displayed in the media content area, when the media is not finished playing at a second time later than the first time; and identifying, by executing the instruction with the processor, the media by comparing the generated digital signature to a database of reference signatures when the media is finished playing.

26. The method as defined in claim 25, wherein analyzing the successive images to determine whether the media player is playing the media includes locating at least an area of the media player that includes a play/pause button and determining whether the area includes a first symbol instead of a second symbol.

\* \* \* \* \*